2,059,164

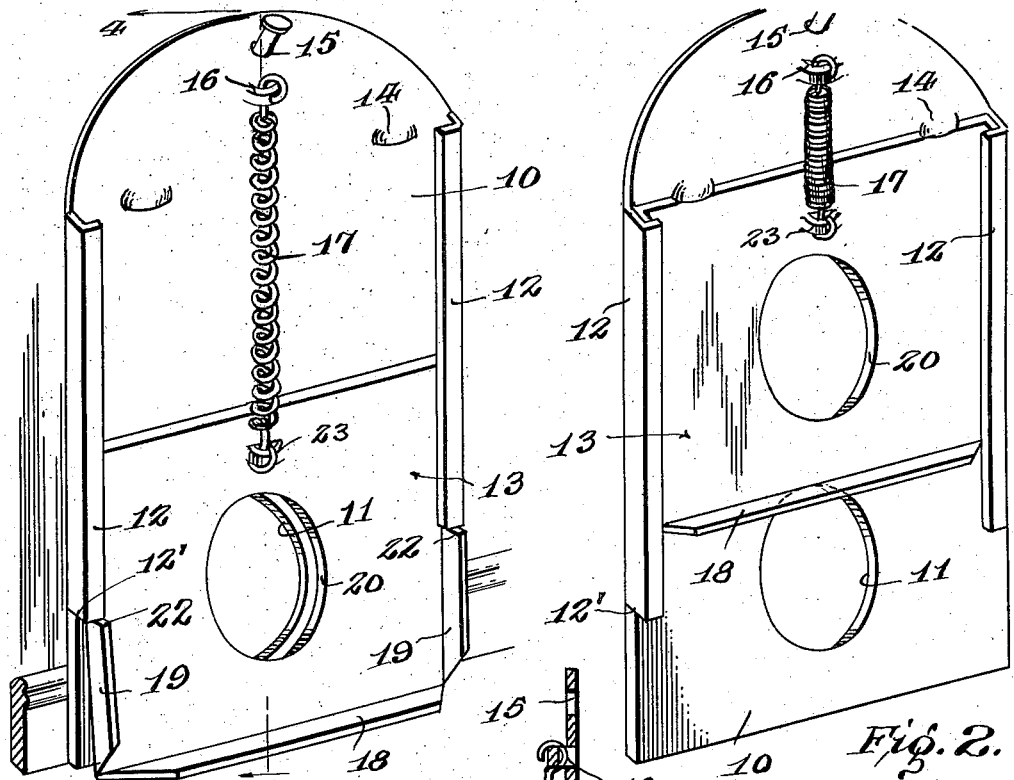
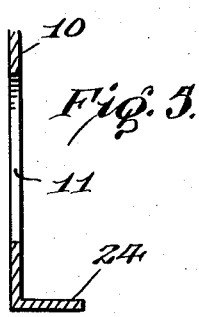
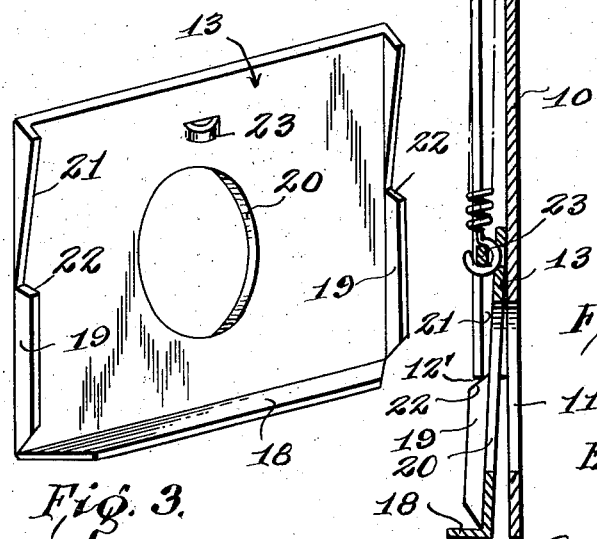
Oct. 27, 1936. E. R. WOODS 2,059,164
TRAP CONSTRUCTION
Filed Dec. 2, 1935
Inventor
Emmett R. Woods,
By Christian L. Nielsen,
Attorney Patented Oct. 27, 1936

UNITED STATES PATENT OFFICE 2,059,164

TRAP CONSTRUCTION

Emmett R. Woods, Carlisle, Pa., assignor to
F. Lourene Woods, Carlisle, Pa.

Application December 2, 1935, Serial No. 52,572

5 Claims. (Cl. 43—78)

My invention relates to trap constructions, and more particularly to animal traps of the "choker" type, and it consists in the constructions, arrangements and combinations herein described and claimed.

It is a main object of the invention to provide a construction of trap which may be employed in situations where an animal enters and leaves its lair by way of a hole in a wall, tree or similar situation.

It is also an object of the invention to provide a trap of the character mentioned wherein the sliding choker plate also functions as a trigger, thereby simplifying the construction, and assembly of the trap, as well as reducing the number of moving elements of the trap.

It is a still further object of the invention to provide a trap construction which may be formed from sheet metal by simple stamping operations, thus permitting the manufacture of the trap at an extremely low cost.

Additional objects, advantages and features of invention will be apparent from the following description and accompanying drawing, wherein Figure 1 is a perspective view of the trap in set position.

Figure 2 is a similar view, in sprung position.

Figure 3 is a perspective view of the choker-trigger plate.

Figure 4 is a longitudinal sectional view on the line 4—4 of Figure 1.

Figure 5 is a modified form of base plate.

There is illustrated a base plate 10 of suitable gauge sheet metal, having an opening 11 adjacent one end thereof, the opening being of ample size to admit passage of an animal therethrough. The longitudinal edges of the plate 10 are provided with inturned flanges 12, these flanges extending from adjacent the top portion of the plate to a point approximately midway of the aperture 11. These flanges 12 function as guide means for a combined trigger-choker plate 13, and for this reason the flanges 12 are spaced a distance outwardly from the plate 10 to permit free sliding movements of the plate 13 as well as a slight canting thereof, as will be explained more fully hereinafter.

The base plate 10 is provided with a pair of stop lugs 14 located on a line approximately with the termination of the upper edges of the flanges 12, and further includes an aperture 15 for suspending the trap in an upright position in advance of the entrance opening for an animal to be trapped. The plate 10 also has an opening 16 serving as an anchorage for one end of a helical spring 17.

The trigger plate 13 has its lower edge bent at right angles to form a foot 18, and the vertical edges are also bent at right angles to form shoulders 19. These shoulders 19 are of lesser height than the inturned flanges 12, so that a slight lateral or canting movement of the choker plate 13 will be permitted, when the plate 13 is positioned between the flanges 12. An aperture 20 is formed in the plate 13 of similar size to the aperture 11 of the base plate and is adapted to register therewith in the set position of the trap, as shown in Fig. 1.

The shoulders 19 are cut at an angle so as to present an inclined face 21, the lowest point being located approximately midway of the aperture 20, and from this low point the shoulders 19 rise to their normal height, but have slightly bevelled abutments 22. These abutments 22 function as triggers for maintaining the choker plate in set position. The choker plate 13 also has an opening 23 for reception of the other end of the spring 17.

In assembly of the trap, the choker plate 13 is presented within the flanges 12 so that the shoulders 19 are presented beneath the flanges 12, and in this relation of the parts the abutments 22 may engage respective lower terminations 12' of the flanges 12. The helical spring 17 is next anchored at respective ends in the apertures 16 and 23 of the base and choker plates.

In use, the trap may be suspended from a wall, by means of a nail, so that the apertures 11 and 20 register with the entrance opening for an animal and therefore must pass through the apertures in any attempt to enter or leave its lair.

The setting of the trap is accomplished by drawing the choker plate 13 downwardly so as to bring the opening 20 slightly below the opening 11, and this position of the choker plate will present the abutments 22 below the terminations or shoulders 12'. The plate 13 is then given a lateral or canting movement outwardly away from the base plate 10 which will be permitted by the inclined faces 21, until the abutments 22 are in line with the shoulders 12' when the plate 13 is allowed to move backwardly, due to action of the spring 17, permitting the abutments 22 to engage the shoulders 12'. The choker plate 13 will thus be held in set position with the apertures 11—20 aligned, which position of the plate is assured by reason of anchorage of the spring adjacent its upper end, causing the lower end of the plate 13 to swing outwardly. Obviously, the weight of an animal passing through the opening 20 and imparted to the choker plate 13 will release the abutments 22 from the shoulders 12' with consequent release of the choker plate, causing the animal to be caught between the upper and lower edges of the apertures 11—20.

If desired, the base plate 10 may be provided with a laterally extended foot 24, as shown in Figure 5, permitting support of the trap in an upright position.

While I have shown and described a preferred construction I am well aware that changes may be made and I therefore consider as my own all such modifications as fairly fall within the scope of the appended claims.

I claim:—

1. A trap comprising a base plate having an aperture and flange members, a choker plate longitudinally slidable within the flange members, said choker plate having an aperture for registry with the first named aperture, abutments on the choker plate adapted to engage the flange members, and spring means anchored to the base plate and choker plate to draw the latter inwardly along the flange members.

2. A trap comprising a base plate having flange members at the edges thereof and an aperture adjacent one end, a choker plate longitudinally slidable within the flange members and having limited lateral movement, said choker plate having an aperture for registry with the first named aperture, abutments on the choker plate adapted to engage the flange members, and spring means anchored to the base plate and choker plate to draw the latter inwardly along the flange members upon lateral movement of the choker plate.

3. A trap comprising a base plate having flange members at the edge thereof and an aperture adjacent one end, a choker plate longitudinally slidable within the flange members and having a limited lateral movement, said choker plate having a shoulder positioned beneath the flange members, said shoulders having an abutment adapted to engage the flange members, spring means anchored to the base plate and choker plate to draw the latter inwardly along the flange members upon disengagement of the abutment and flange members and said choker plate having an aperture for registry with the first named aperture.

4. A trap comprising a plate having an aperture adjacent one end thereof, a channel on each of the longitudinal edges of the plate, said channels stopping approximately midway of the aperture, a choker plate slidable within the channel and having an aperture for registry with the first named aperture, trigger means on the choker plate adapted to engage respective channels to hold the choker plate in its lowermost position, and spring means associated with the choker plate tending to draw the plate to an innermost position, said choker plate having lateral movement to release inward movement of the choker plate.

5. A trap comprising a base plate having an aperture adjacent one end thereof, a channel on each of the longitudinal edges of the plate, said channels stopping approximately midway of the aperture, a choker plate slidable within the channels and having an aperture for registry with the first named aperture, said choker plate having right angularly disposed shoulders positioned beneath respective channel members, each shoulder having an inclined face tapering in the direction of its lower end and stopping short approximately midway of the aperture of the choker plate and terminating in an abutment, said choker plate being movable laterally to engage the abutments with the lower ends of the channels, and spring means between the choker plate and the base plate to forcibly draw the choker plate inwardly along the channel members upon disengagement of the abutments from the channels.

EMMETT R. WOODS.